United States Patent [19]

Grasso et al.

[11] Patent Number: 4,835,072
[45] Date of Patent: May 30, 1989

[54] APPARATUS EMPLOYING AN AQUEOUS SOLUTION

[75] Inventors: Albert P. Grasso, Vernon; Wolfgang M. Vogel, Glastonbury, both of Conn.

[73] Assignee: International Fuel Cells Corporation, Hartford, Conn.

[21] Appl. No.: 745,464

[22] Filed: Jun. 17, 1985

[51] Int. Cl.⁴ .................. H07M 8/00; H07M 8/18
[52] U.S. Cl. ..................... 429/12; 429/26; 422/19
[58] Field of Search ............... 429/12, 26; 422/19

[56] References Cited

U.S. PATENT DOCUMENTS

| | | |
|---|---|---|
| 1,368,748 | 2/1921 | Penniman, Jr. et al. |
| 1,520,823 | 12/1924 | Kestner ............................ 422/19 |
| 3,904,540 | 9/1975 | Bennetch et al. ............. 252/62.54 |
| 3,912,646 | 10/1975 | Leitner et al. ................ 252/62.56 |
| 3,919,404 | 11/1975 | Beck ................................... 423/633 |
| 3,923,546 | 12/1975 | Katz et al. ...................... 136/86 R |
| 3,929,468 | 12/1975 | Siemens et al. ..................... 75/103 |
| 3,931,025 | 1/1976 | Woditsch et al. ............. 252/62.62 |
| 3,940,285 | 2/1976 | Nickols, Jr. et al. .......... 136/86 R |
| 3,946,103 | 3/1976 | Hund ................................. 423/633 |
| 3,964,929 | 6/1976 | Grevstad ......................... 136/86 R |
| 4,006,090 | 2/1977 | Beck ................................ 252/62.56 |
| 4,112,063 | 9/1978 | Buxbaum et al. ................. 423/633 |
| 4,123,501 | 10/1978 | Kohler et al. .................... 423/152 |
| 4,344,849 | 8/1982 | Grasso et al. ................... 429/17 X |
| 4,361,486 | 11/1982 | Hou et al. ........................ 210/722 |
| 4,430,228 | 2/1984 | Paterson ...................... 210/688 X |
| 4,451,361 | 5/1984 | Paterson .......................... 210/136 |
| 4,451,506 | 5/1984 | Kobayashi et al. .............. 427/239 |

FOREIGN PATENT DOCUMENTS

WO82/02541 8/1982 PCT Int'l Appl.
A2114113 1/1985 United Kingdom.

OTHER PUBLICATIONS

Crystal Nucleation in Fe(III) Solutions and Hydroxide Gels, J. Inorg. Nucl. Chem., 1968, vol. 30, pp. 2371-2381.

Primary Examiner—Stephen J. Kalafut

[57] ABSTRACT

An apparatus, such as a fuel cell powerplant 10 or a boiler 168, having a flow path for an aqueous solution and a method for operating the apparatus are disclosed. The aqueous solution includes water, iron based compounds, and ferric hydrous oxide of a character that retards the deposition of iron based compounds on the interior of the conduit.

16 Claims, 6 Drawing Sheets

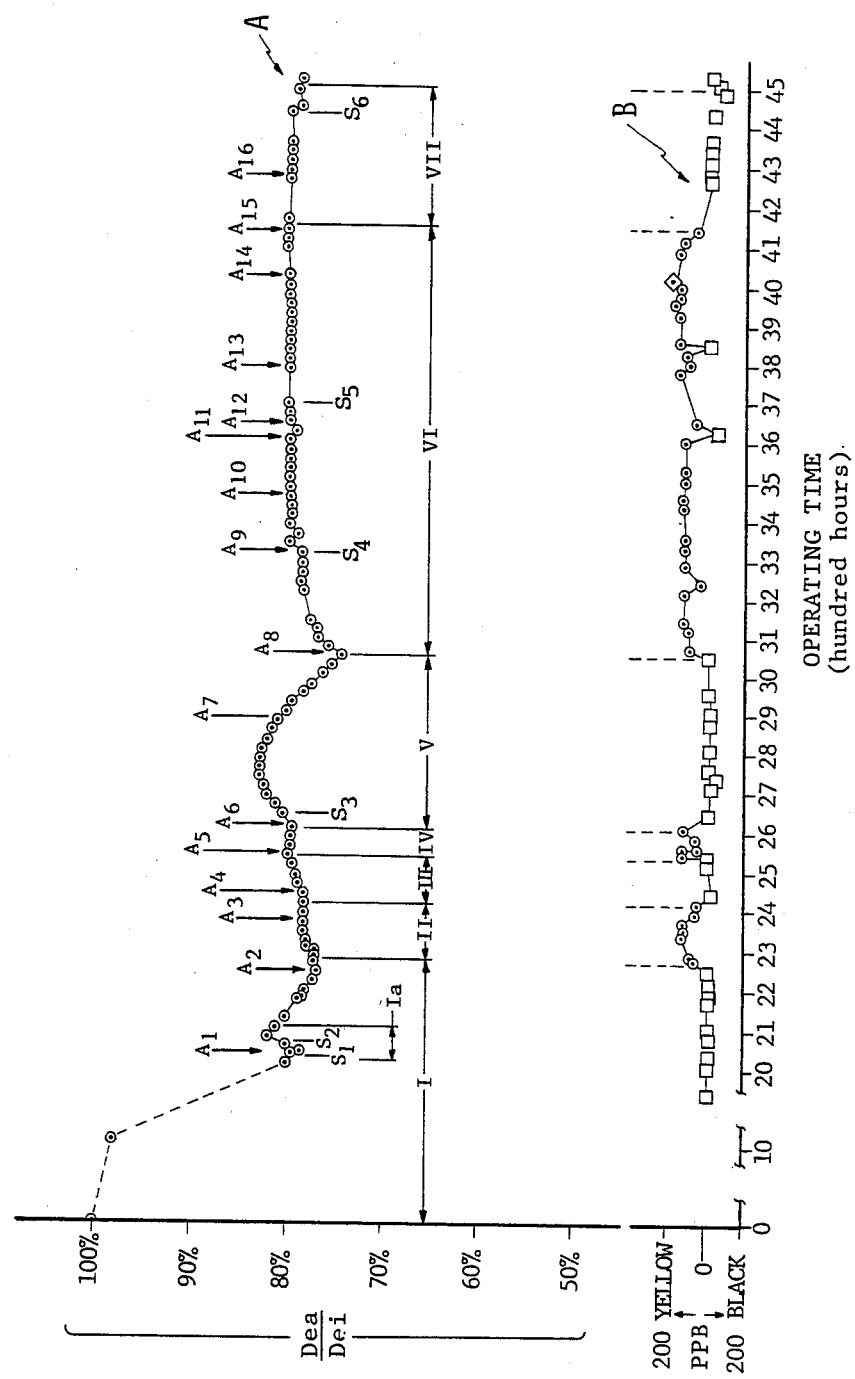

APPARATUS EMPLOYING AN AQUEOUS SOLUTION

CROSS REFERENCE TO RELATED APPLICATIONS

This application relates to U.S. Application Ser. No. 745,465, filed June 17, 1985 for Fuel Cell Powerplant Employing An Aqueous Solution by William A. Taylor; U.S. Application Ser. No. 746,167, filed June 18, 1985 for Fuel Cell Powerplant Employing An Aqueous Solution by Albert P. Grasso et al.; and, U.S. Application Ser. No. 746,168, filed June 18, 1985 for Apparatus Employing An Aqueous Solution by Albert P. Grasso et al.

TECHNICAL FIELD

This invention relates to an apparatus which use an aqueous solution as a working medium. The working medium may be used to remove heat from components or to produce steam. Although this invention was developed for use in the field of fuel cell powerplants, the invention may have application in any field employing aqueous solutions that deposit iron based compounds on the walls of the conduit such as boilers which are used to raise steam.

BACKGROUND OF INVENTION

One example of an apparatus that uses an aqueous solution is a fuel cell powerplant. Fuel cell powerplants produce electric power by electrochemically consuming a fuel and an oxidant in one or more electrochemical cells. The oxidant may be pure oxygen or a mixture of gases containing oxygen, such as air. The fuel may be hydrogen. One source of hydrogen is a fuel processor that reforms natural gas or any appropriate hydrocarbon by using heat and steam to crack hydrocarbons.

Typically, a stack of fuel cells is used in performing the electrochemical reaction. During the electrochemical reaction, the fuel cell stack produces electric power, a reactant product and waste heat. A cooling system removes waste heat from the stack. The cooling system may advantageously use an aqueous coolant to provide both waste heat and water (as steam) to the fuel processor.

The cooling system includes flow paths for the aqueous coolant which are bounded by conduits. The conduits extend to the steam separator and to the fuel cell stack for ducting the coolant to critical locations. These conduits may have small orifices for controlling the distribution of coolant throughout the cooling system.

One problem with aqueous coolants is the cumulative deposition of particles on the walls of conduits. The particles may occur as ions or as minute parts of matter. The particles, which are capable of accumulation to the point of blockage, are generally iron based compounds. These iron based compounds are composed mainly of iron based oxides, such as magnetite and hematite, iron based salts, such as iron phosphates, and other compounds which result from the corrosion of iron including certain ferric hydrous oxide particles (hereinafter type I ferric hydrous oxide). The iron based compounds may form as the coolant comes in contact with materials containing iron. Such contact might occur as the coolant is flowed through conduits in the powerplant or through supply conduits to the powerplant.

The problem is particularly troublesome for cooling systems using small orifices because the particles may block the orifices. Any blockage of an orifice in a fuel cell stack, for example, will increase the flow resistance through the stack and may even cause an inadequate supply of coolant to a critical location within the fuel cell stack.

One way of establishing the effect of such deposition on flow resistance through the stack is to treat the supply conduits of the fuel cell stack as if they were an equal number of equally sized ideal orifices. The diameter of these equally sized orifices is called the equivalent diameter of the fuel cell stack. The equivalent diameter may be found experimentally as follows:

1. Establish a constant flow rate of coolant through the fuel cell stack.
2. Measure the pressure drop through the fuel cell stack.
3. Calculate an equivalent diameter for the stack (or any system) by the equation $$De = 2.8 \, (W^2/\Delta P N^2 d)^{\frac{1}{4}} \, 10^{-7}$$

where:
De = Effective Diameter, inches;
W = Total Coolant Flow (pound per cubic foot);
d = Coolant Density (pounds per cubic foot);
N = Number of Conduits in Cell Stack;
$\Delta P$ = Differential Coolant Pressure Across Cell Stack (pounds per square inch, difference).

The above method may be used with any system having an interior by modeling the system with a conduit which simulates the temperature pressure and other physical conditions which are present.

FIG. 2 is an example of the effect such depositions can have on the equivalent diameter of a fuel cell stack under actual operative conditions. After twenty-five hundred hours of operation (curve A) the actual equivalent diameter Dea was less then seventy percent of the initial equivalent diameter Dei. The decrease in size and the resulting decrease in the flow rate of coolant required a shutdown of the fuel cell stack for cleaning.

The fuel cell stack was cleaned after this period of operation by flowing a pressurized, acidic solution through the conduits. Cleaning restored the actual equivalent diameter Dea to ninety-five percent of the initial effective diameter Dei (curve B). After another twenty-two hundred hours of operation (curve B), the actual equivalent diameter decreased to less than seventy percent of the initial equivalent diameter. Again, both the decrease in size and the reduced coolant flow rate required the shutdown of the fuel cell stack for a second cleaning. The fuel cell stack was also shutdown for other reasons at 3,700 hours of operation (curve B) before the second cleaning. After restarting the powerplant, the equivalent diameter recovered for a short period (approximately 250 hours) before decreasing again. It is theorized that the recovery is connected with transient conditions in temperature and flow rate which occur during a shutdown and start-up of the fuel cell stack. As shown, the effect is temporary.

The powerplant was cleaned again for a second time. After less than sixteen hundred hours of operation (curve C), the effective diameter decreased to almost seventy percent of the initial equivalent diameter.

These periodic shutdowns and cleaning operations which result from particle deposition are both time consuming and costly.

Several approaches have been suggested for solving the problem of particle deposition from an aqueous coolant. One suggested approach is to reduce the amount of particles (including particles that are ions) by providing a purified aqueous coolant, suppressing corrosion by raising the coolant's pH to high levels consistent with materials used in constructing the system and by reducing the dissolved oxygen levels below forty parts per billion (40 ppb).

Chemical additives are used in highly contaminated solutions to promote the formation of sludge which is periodically removed from the system.

Ironically, cleaning out the sludge formed by the chemical additives is a common cause for service.

Another suggested approach for reducing the amount of particles is to use an aqueous coolant having a pH of about 6 to 8. Moderate levels of dissolved oxygen are permitted in the water (40–400 ppb) to suppress corrosion. Chemical additives are generally avoided.

Each of the above-mentioned methods utilizes a controlled flush rate from the system, called blowdown, which is necessary because corrosion cannot be totally eliminated and chemical cleaning is eventually required. The aqueous coolant that is lost is replaced by adding coolant. The added coolant is commonly called feedwater.

As will be realized, these techniques are equally applicable to the task of suppressing corrosion in high temperature apparatuses that use aqueous solutions such as boilers which raise steam. Boilers and other high temperature water systems experience corrosion and deposition problems which require extensive control of the water chemistry to achieve reliable system service. General industry experience has shown that even with the best efforts towards maintaining the water chemistry results are varied and repairs and/or cleaning is eventually necessary.

Despite the existence of these techniques for suppressing corrosion and for controlling the amount of iron based compounds in cooling systems having an aqueous coolant, scientists and engineers are seeking to develop additional ways of suppressing corrosion and directly blocking the severe deposition of iron based compounds on the walls of conduits.

DISCLOSURE OF INVENTION

According to the present invention, an aqueous solution for use in an apparatus consists essentially of water that meets certain specifications and that contains an amount of ferric hydrous oxide of a character that retards the deposition of iron based compounds on the interior of the apparatus (hereinafter type II ferric hydrous oxide).

In accordance with one embodiment of the present invention, the aqueous solution is provided to a boiler where it is mixed with process water for raising steam.

A feature of the present invention is water having a pH which is at least 5.5, an electrical conductivity which is less than or equal to one micromho per centimeter and a solids content less than one part per million that includes an amount of iron based compounds other than type II ferric hydrous oxide. Another feature is ferric hydrous oxide disposed in the water, the ferric hydrous oxide being of a character that retards the deposition of iron based compounds on the interior of the conduit (type II ferric hydrous oxide).

Another advantage is the suppression of corrosion in boilers which results from using such ferric hydrous oxide in the boiler, such as for feedwater to the boiler.

The foregoing features and advantages of the present invention will become more apparent in light of the following detailed description of the best mode for carrying out the invention and in the accompanying drawings.

BRIEF DESCRIPTION OF DRAWINGS

FIG. 6 is a graphical representation of the equivalent diameter $D_{ea}$ versus run time under operative conditions with the addition of type II ferric hydrous oxide; the equivalent diameter is normalized by dividing by the initial equivalent diameter $D_{ei}$.

BEST MODE FOR CARRYING OUT THE INVENTION

Figure 1:
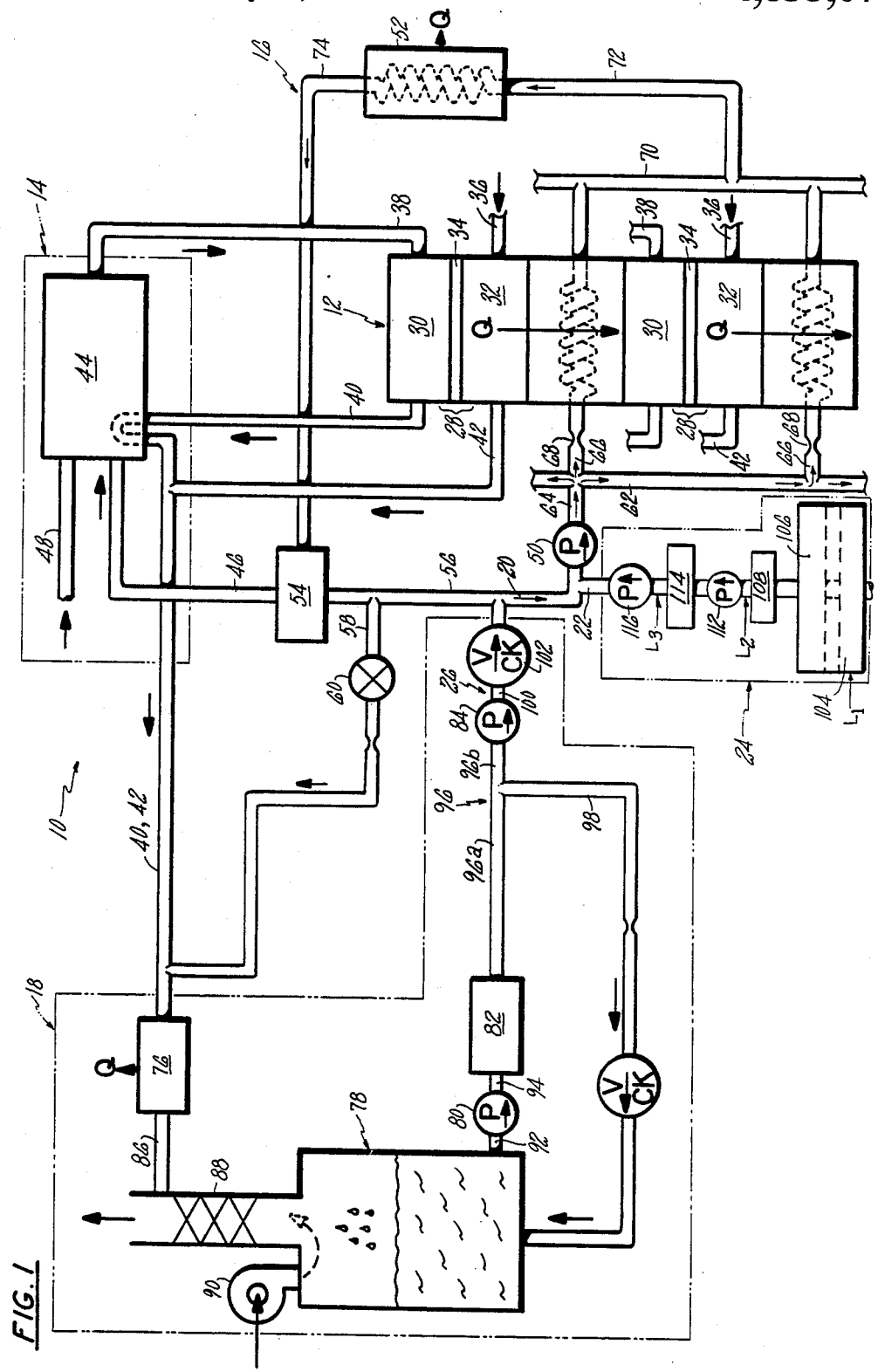
FIG. 1 is a schematic representation of an actual fuel cell powerplant having a cooling system which uses an aqueous solution as a coolant and as a source of steam and further shows an auxiliary system for supplying type II ferric hydrous oxide to the powerplant under operative conditions.
Figure 2:
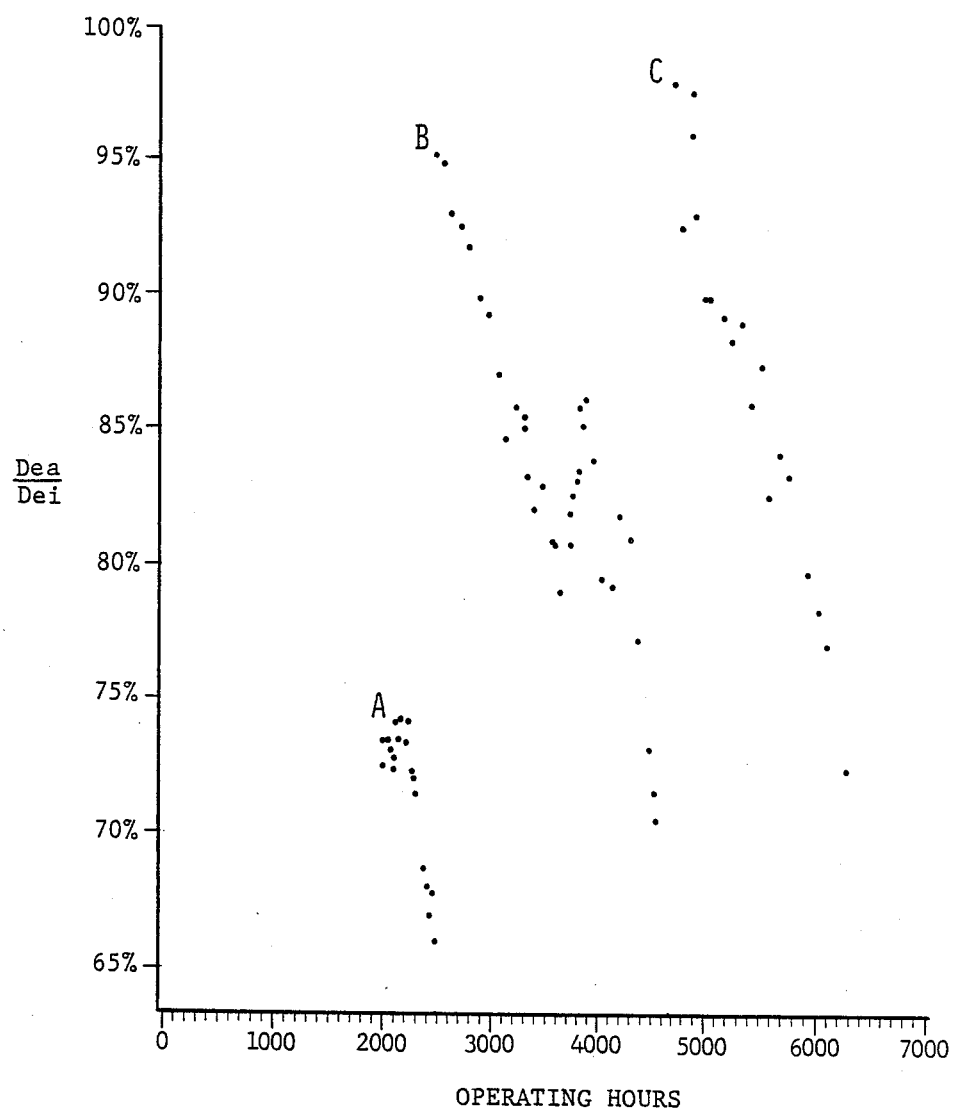
FIG. 2 is a graphical representation of the equivalent diameter $D_{ea}$ of the fuel cell stack versus run time under operative conditions without the addition of type II ferric hydrous oxide; the equivalent diameter is normalized by dividing by the initial equivalent diameter $D_{ei}$.

FIG. 1 is a schematic representation of an apparatus, such as a fuel cell powerplant 10. The fuel cell owerplant includes a fuel cell stack 12, a fuel processing system 14, a cooling system 16 and a coolant recovery and supply system (CRS) 18. The cooling system 16 has a flow path 20 for coolant which, in the embodiment shown, is an aqueous solution. A means for disposing type II ferric hydrous oxide in the aqueous coolant, such as conduit 22, is in communication with the flow path 20. As shown, the conduit 22 is part of an auxiliary system 24 for supplying type II ferric hydrous oxide to the powerplant under laboratory conditions. Alternatively, the conduit 22 might be in flow communication with the coolant recovery and supply system 18 at location 26.

The fuel cell stack 12 includes a plurality of electrochemical cells as represented by the two electrochemical cells 28. Each electrochemical cell has an anode 30, a cathode 32, and an electrolyte 34 disposed between the anode and cathode. The electrolyte places the anode in ionic communication with the cathode. Air is supplied to each cathode via conduit 36. Processed fuel is supplied to the anode via conduit 38. A portion of the fuel is combined electrochemically with a portion of the oxygen in the air via the electrolyte to produce electric power. The remaining processed fuel is exhausted from the anode and flowed via conduit 40 to the fuel processing system 14 where the fuel is combusted. The remaining oxygen is exhausted from the cathode and merged with the anode exhaust via conduit 42.

The fuel processing system 14 includes a fuel processor 44. The fuel processor receives steam via conduit 46 and a raw fuel, such as natural gas, via conduit 48. The fuel processor catalytically combines the steam and the raw fuel to produce a processed fuel such as hydrogen. Because this reaction is endothermic, the fuel processor has a burner (not shown) for generating heat. The unreacted process fuel from the stack is burned in this burner.

The cooling system has a coolant pump 50 for circulating pressurized aqueous coolant, a heat exchanger 52 for removing heat from the aqueous coolant and a steam separator 54 for separating steam from the aqueous coolant.

Under normal operating conditions, the temperature of the aqueous coolant generally reaches approximately three-hundred and fifty degrees Fahrenheit (350° F.; 180° C.) and in powerplants may typically range between 160° C. to 205° C. with an oxygen concentration ranging between 20-400 ppb with the most likely range being between 40-80ppb. Steam separated from the aqueous coolant in the steam separator 54 is flowed via conduit 46 to the fuel processor 44. Conduit 56 extends from the steam separator to the coolant pump 50 to enable the coolant pump to draw coolant from the steam separator. A blow down conduit 58 extends from conduit 56 at a point downstream of the steam separator and upstream of the coolant pump. The blow down conduit has a blow down control 60 for removing a portion of the aqueous coolant to control solids content by exhausting a portion of the coolant to exhaust conduits 40, 42.

The coolant pump 50 delivers pressurized coolant to manifold 62 via conduit 64. A plurality of conduits for the aqueous coolant, as represented by the conduits 66, extend from the manifold 62 through the fuel cell stack. These conduits are regularly spaced along the length of the fuel cell stack, as shown for example in U.S. Pat. No. 4,233,369 issued to Breault et al. entitled "Fuel Cell Cooler Assembly and Edge Seal Means Therefor". Each conduit has an orifice 68 for controlling the distribution of coolant from the manifold to the stack. The coolant which is passed through the stack via conduit 66 is collected by manifold 70. Conduit 72 extends from manifold 70 to the heat exchanger 52 to duct the aqueous coolant to the heat exchanger where heat is removed from the coolant. Conduit 74 completes the cooling loop by extending from the heat exchanger to the steam separator 54.

The coolant recovery and supply system 18 includes a condenser 76, a degasifier 78, a boost pump 80, a water treatment system 82, and a feedwater pump 84.

The condenser receives cathode exhaust directly from the fuel cell stack 12 via conduit 42 and combusted anode exhaust through the fuel processor 14 via conduit 40. These conduits join together with blow down conduit 58 downstream of the fuel processor 44 and duct the steam, cathode exhaust and anode exhaust to the condenser.

The condenser removes heat from the steam, the cathode exhaust and the anode exhaust. As a result, steam from the cooling system and water vapor in the anode and cathode exhaust are condensed as water. The condensed water is flowed from the condenser via conduit 86 to the degasifier 78.

The degasifier 78 is adapted by vent 88 to receive the condensed water. The degasifier has a source of pressurized air, as represented by air pump 90, for passing air through the vent to degasify the incoming water.

The degasified water is collected below the vent at a location which is in flow communication with the boost pump 80. The boost pump 80 draws water from the degasifier via conduit 92 and supplies high pressure water through conduit 94 to the water treatment system 28. The water treatment system removes suspended and dissolved contaminants from the water by filtration and ion exchange demineralization respectively. Oxygen reduction, if desired, may be achieved by thermal steam deaeration while organic removal is achieved by adsorption filtration such as is commonly performed with activated charcoal. The resultant water effluent from the water treatment system is purified water. Conduit 96 extends from the water treatment system to supply purified water to the feedwater pump 84.

A recirculation conduit 98 extends to the degasifier from conduit 96 for returning a portion of the flow supplied by the boost pump to the degasifier. The recirculation conduit divides the conduit 96 into a first portion 96a in flow communication with the water treatment system and a second portion 96b in flow communication with the feedwater pump 84. The feedwater pump supplies aqueous coolant as needed to the cooling system to supply coolant as required. Conduit 100 extends from the feedwater pump through check valve 102 to the cooling system for this purpose. Conduit 100 might alternatively be in flow communication with a means for disposing type II ferric hydrous oxide in the aqueous coolant location 26.

As shown, conduit 22 is a means for disposing type II ferric hydrous oxide in the aqueous coolant and is part of the auxiliary laboratory system 24. The auxiliary laboratory system includes a water tank 104, a water-steam deaerator 106 for storing supply water (normal temperature about 212° F., 100° C.) a heat exchanger 108 (normal temperature 140° F., 60° C.), a boost pump 112, a water treatment system 114 (like water system 82), a feedwater pump 116 and a check valve in conduit 22 (not shown). In this particular application, the water tank and water-steam deaerator are formed as a single unit. The auxiliary system is adapted at the following locations to receive type II ferric hydrous oxide upstream of the water treatment system at the water tank $L_1$ or at the fill port $L_2$; and, downstream of the water treatment system, for example, at the feedwater pump at $L_3$.

Figure 3:
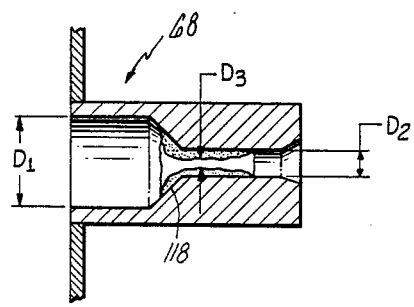
FIG. 3 is an enlarged, cross-sectional view of an orifice used in the cooling system of FIG. 1.

FIG. 3 is an enlarged side elevation view of the orifice 68. The orifice has a maximum diameter $D_1$, a minimum diameter $D_2$ and a contracting transition region between the maximum and minimum diameters 118. The stippled area shows the contour of the orifice having, for example, a minimum diameter $D_3$ which might result from the accretion of particles by deposition during operation of the fuel cell powerplant. As will be realized, the deposition of a large amount of particles will increase the flow resistance of the orifice to the passage of coolant and concomitantly the flow resistance of the fuel cell stack to the coolant.

Figure 4:
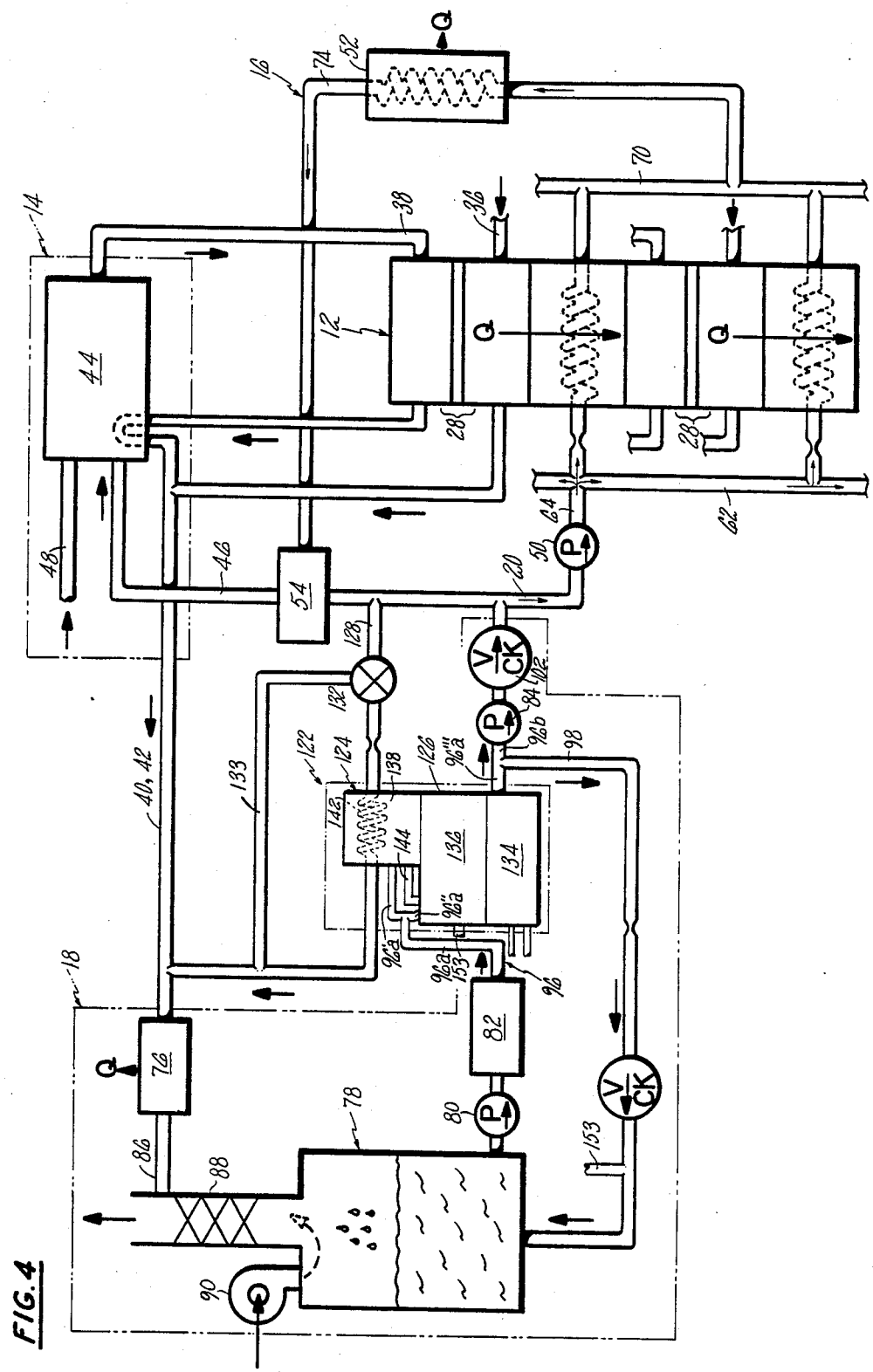
FIG. 4 is an alternate embodiment of the fuel cell powerplant shown in FIG. 1.

FIG. 4 is an alternate embodiment of the fuel cell powerplant shown in FIG. 1 having means 122 for disposing ferric hydrous oxide in the coolant. The means 122 includes means 124 for forming ferric hydrous oxide within the powerplant. The means 124 includes a tank 126, a source of process water and a source of heat. In the embodiment shown, the source of process water is the coolant recovery and supply system 18. The source of heat is the fuel cell stack 12. Means for transferring heat from the fuel cell stack to the tank, such as the cooling system 16, is in flow communication with the heated coolant via conduit 128 and flow control 132. The flow control is responsive to the temperature of the aqueous solution in the tank and the blowdown requirements for the system effluent. A by-pass conduit 133 is provided to by-pass flow as required.

Figure 5:
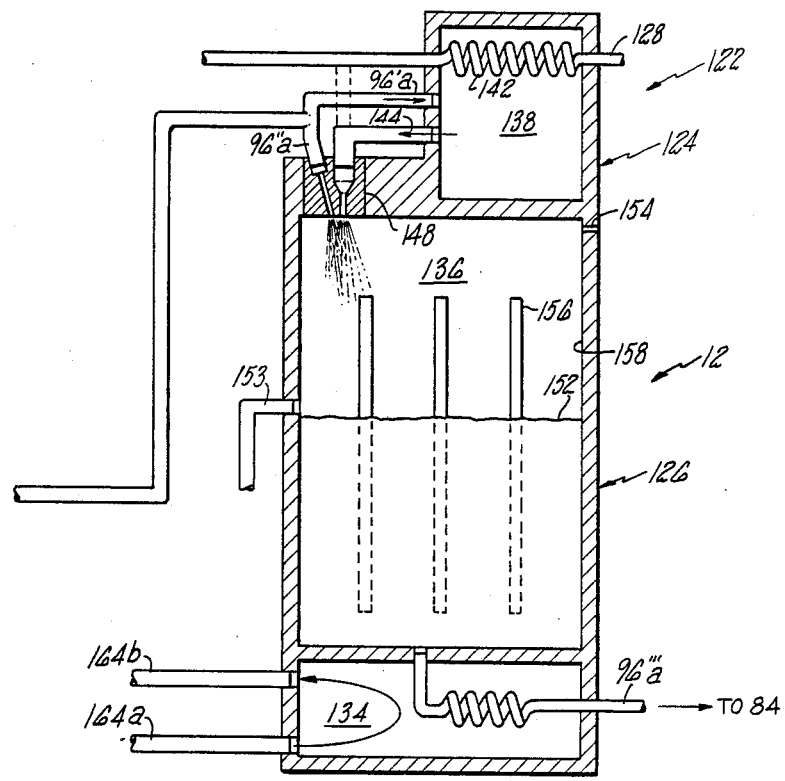
FIG. 5 is an enlarged schematic representation of a portion of the powerplant shown in FIG. 4.

FIG. 5 is an enlarged, schematic representation of the means 124 for forming the hydrous ferric oxide within the power plant. The tank 126 has a first chamber 134, a second chamber 136 and a third chamber 138. The third chamber receives purified water from the water treatment system via conduit 96a. A heat exchanger 142, such as a coil of conduit 128, is disposed in the third chamber to transfer heat to the purified water and to make steam. The second and third chambers 136, 138 might be insulated against the loss of heat to the first chamber.

The second chamber 136 receives purified water via conduit 96a and steam via conduit 144. Alternatively, steam might be provided directly to the second chamber 136 by flowing aqueous coolant from the coolant flow path such as through conduit 128 and conduit 146 shown in phantom.

The second chamber 136 is adapted by a nozzle 148 to mix the steam from conduit 144 and the process water from conduit 96a' and inject the mixture into the chamber. One suitable nozzle for this purpose is the $\frac{1}{4}$J Siphon Spray Nozzle available from Spraying Systems, Inc., North Avenue, Wharton, ILL. 60187. After injection, the water collects in the tank leaving a steam-water interface 152. The water level in chamber 136 is controlled by continuing over flow through a conduit 153 which extends back to the degasifier through conduit 98. A portion of conduit 153 is broken away for clarity. A vent 154 is provided for venting gases released during the mixing process.

The second chamber 136 has a source of iron disposed in the tank, such as rods 156 formed of an iron alloy or an iron containing liner 158 on the walls of the tank. Conduit 96a''' for withdrawing process water extends from the second chamber through the third chamber of the tank and thence to feedwater pump 84. A heat exchanger 162 is disposed in the first chamber 134. The heat exchanger is in flow communication via conduits 164a and 164b with a source of coolant, such as the purified water of conduit 96, for removing heat from the process water in conduit 96a'''.

Figure 7:
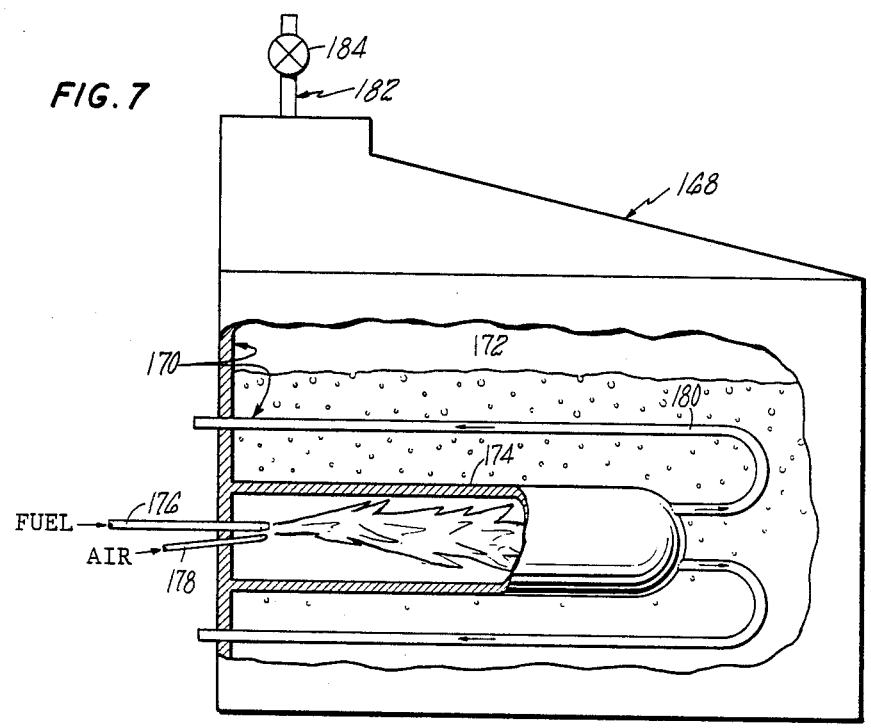
FIG. 7 is a schematic representation of a boiler.

FIG. 7 is a side elevation view of a high temperature apparatus, such as a tube fired boiler 168, partially broken away and partially in section. The boiler has an interior 170 which includes a cavity 172 filled with an aqueous solution. A combustion chamber 174 extends into the cavity. A fuel nozzle 176 and an air nozzle 178 extend into the combustion chamber for supplying fuel and oxidant to the combustion chamber. The interior 170 of the boiler includes conduits, in the form of tubes 180, which extend through the cavity in contact with the aqueous solution for ducting hot gases from the combustion chambers to exhaust the gases and to place the hot gases in heat transfer communication with the aqueous solution for raising steam. The steam is ducted through conduit 182 and control valve 184 to a device which uses the steam for useful purposes.

During actual operation of the fuel cell powerplant represented in FIG. 1, the deposition of iron based compounds (that is, iron based oxides and salts including magnetite, hematite, iron phosphates and other compounds resulting from iron corrosion) is retarded by disposing in the aqueous coolant type II ferric hydrous oxide (that is, $Fe_2O_3 \cdot XH_2O$ or $FeOOH$ of a character that retards the deposition of iron based compounds). Experimental work has confirmed this result. A portion of this work is shown in FIG. 6.

The upper curve of FIG. 6 (curve A) is a graphical representation of the variation with time of the equivalent diameter of the fuel cell stack Dea under operative conditions. The lower curve (curve B) beginning at about 2,000 hours shows the presence or absence of ferric hydrous oxide in the feedwater to the aqueous coolant which is supplied via auxiliary system 24 through conduit 22.

In general, FIG. 6. shows that the presence of suspended type II ferric hydrous oxide in the feedwater, as evidenced by a yellow colored feedwater filter stain reported in curve B, precedes slightly and generally corresponds to periods of stable or increasing equivalent diameter as shown by curve A. Examples are the time periods II, IV, and VI. Conversely, the absence of ferric hydrous oxide in the feedwater, as evidenced by the lack of a yellow feedwater filter stain, corresponds to periods of decreasing equivalent diameter such as periods I and V. The effect of injecting type II ferric hydrous oxide is not instantaneous and precedes for a short period the effect on the equivalent diameter of the fuel cell stack.

More particularly, curve A of FIG. 6 shows the equivalent diameter Dea of the fuel cell stack normalized by dividing by the initial equivalent diameter Dei. The actual equivalent diameter is Dea and is equal to Dei at the time the fuel cell stack begins operation. Curve B shows the intensity and color produced by filtering the feedwater through 0.45 micron filter paper in accordance with the techniques described by the Babcock and Wilcox membrane filter comparison charts. These charts are published by the Babcock and Wilcox Company, Power Generation Divison, (copyright 1964, 1970) New York, New York entitled "Membrane Filter Comparison Chart ($Fe_2O_3 \cdot XH_2O$)"; "Membrane Filter Comparison Chart ($Fe_2O_3 \cdot XH_2O$-$Fe_3O_4$) 1.5:1"; "Membrane Filter Comparison Chart ($Fe_2O_3 \cdot XH_2O$-$Fe_3O_4$) 2:1"; "Membrane Filter Comparison Chart ($Fe_2O_3 \cdot XH_2O$-$Fe_3O_4$) 1:1"; and, "Membrane Filter Comparison Chart ($Fe_3O_4$)". The material in these charts is incorporated herein by reference.

The comparison of the stains left by the feedwater with the membrane filter comparison chart enables an estimation of the presence of the ferric hydrous oxide in the feedwter to the cooling system. For example, the feedwater filter stains show that ferric hydrous oxide was present in the feedwater in amounts of about 50 to 200 parts per billion. Similarly, when ferric hydrous oxide was absent, black iron oxides were frequently present in an amount of about 100 to less than 10 parts per billion.

During the first 2,000 hours of operation in period I prior to the addition of type II ferric hydrous oxide, the pressure drop through the stack increased and the effective diameter decreased as iron based compounds were deposited on the walls of the cooling system.

Prior to the addition of the type II ferric hydrous oxide, the coolant for the fuel cell stack was an aqueous coolant and the feedwater was purified water from a water treatment system. The purified water was treated condensate water fed via conduit 100 which was deionized and deoxygenated to a level of 40 to 200 parts per billion by various procedures which are well-known. This purified water will have a pH which is greater than 5.5 (preferably in a range from 5.5–8.0), a conductivity which is less than one micromho per centimeter, an alkalinity level of less than 0.2 ppm as calcium carbonate, a solids content which is less than one part per million (1 ppm) including less than 200 parts per billion of iron based compounds other than ferric hydrous oxide.

The period of time Ia shows the effect which accompanies shutdown and start-up of the powerplant during the period when the feedwater was only purified water. Shutdown and start-ups occurred together respectively at times $S_1$ and $S_2$. Simultaneously with the start-ups, feedwater was supplied via conduit 22. Type II ferric hydrous oxide was disposed in the feedwater by injecting continuously from time $A_1$ a solution of type II ferric hydrous oxide and purified water into the feedwater system. This feedwater solution (or feedwater) was fed through conduit 22 at a steady average flow rate of one-tenth of a gallon per minute (0.1 gpm) into the flow path 20 for the aqueous coolant having a steady state average flow rate of five gallons per minute (5 gpm).

At time $A_1$, the feedwater was flowed to the water tank at $L_1$ upstream of the water treatment system 114. It is believed that the water treatment system removed the ferric hydrous oxide from the aqueous coolant. This is evidenced (curve B) by the absence of the yellow feedwater filter stain. As a result of the absence of ferric hydrous oxide, the equivalent diameter decreased except for the temporary effect of shutdown and start-up.

Just before the beginning of time period II at time $A_2$, the supply of water containing type II ferric hydrous oxide was injected into the feedwater downstream of the water treatment system at location $L_3$, and, the water treatment system was made inactive. The feedwater yellow filter stain reappeared and the equivalent diameter began to recover.

During period II, beginning at $A_3$, the point of injection for the ferric hydrous oxide was moved from downstream of the water treatment system to upstream of the water treatment system at the fill port $L_2$, and, the water treatment system was kept inactive.

The feedwater yellow stain continued and the equivalent diameter remained stable.

During period III beginning at $A_4$, ferric hydrous oxide was still added at location $L_2$ upstream of the water treatment system, but the water treatment system was made active for a short period of time. Soon after the water treatment system was made active, the ferric hydrous oxide disappeared from the feedwater as evidenced by the absence of the feedwater yellow filter stain.

At time $A_5$ at the beginning of period IV, the point of injection was moved further upstream of the water treatment system to the tank $L_1$, and the water treatment system was made inactive. The feedwater yellow filter stain reappeared for all of period IV.

At time $A_6$ at the beginning of period V, injection continued at the water tank $L_1$ upstream of the water treatment system, but now the water treatment system was made active. The ferric hydrous oxide again disappeared from the feedwater as evidenced by the absence of the yellow filter stain during period V. Shortly after $A_6$, a six day shutdown was followed by a start-up $S_3$. The effective diameter continued to increase for a short period after the water treatment system was made active (possibly because of shutdown and start-up), but the yellow feedwater filter stain never reappeared and the equivalent diameter decreased for the remainder of period V. This included time after $A_7$ when the point of injection of the type II ferric hydrous oxide was moved downstream to the fill port at $L_2$ (but still upstream of the active water treatment system).

The downstream water treatment system was finally made inactive at time $A_8$ at the beginning of the period VI. The yellow filter stain reappeared and the equivalent diameter began to recover.

At time $A_9$, the powerplant went through a shutdown, start-up cycle $S_5$. During shutdown, the cooling system was drained and refilled with water containing type II ferric hydrous oxide. After $A_{10}$, the downstream water treatment system was kept inactive while water containing type II ferric hydrous oxide was continuously at the fill port $L_2$. The yellow feedwater filter stain continued and the equivalent diameter remained stable.

The downstream water treatment system was made active again at $A_{11}$ until $A_{15}$ when the water treatment system was by-passed. It is thought the water treatment system was ineffective during this period because it no longer removed the ferric hydrous oxide as evidenced by the continued presence of the feedwater yellow filter stain.

Type II ferric hydrous oxide continued to be added upstream of the water treatment system at $A_{15}$ and $A_{16}$ followed by replacement of water treatment system components. The new water treatment system components removed the ferric hydrous oxides as evidenced by the absence of the feedwater yellow stain.

Thus, the deposition of iron based compounds is retarded, in some cases eliminated, and in other cases reversed by injecting type II ferric hydrous oxide into the feedwater and thence into the aqueous coolant.

Subsequent tests showed that feedwater from the coolant recovery and supply system that was added at location 26 corrected the depositing characteristics of the iron-based compounds if it contained as little as one part type II ferric hydrous oxide water to three parts purified water.

The phenomena by which the retardation of the deposition of these iron based compounds occurs is not well understood. One working hypothesis is as follows. The iron based compounds are charged (experience suggests negatively charged) and surrounded by a cloud of oppositely charged ions to form an electrical double layer. Particles of type II ferric hydrous oxide react with the normally depositing iron based compounds to destabilize them by shrinking or eliminating the double layer through changing the level of charge on the compounds. As a result, the iron based compounds are coagulated or agglomerated by the ferric hydrous oxide to an extent that interferes with their deposition on the walls of the water conduit.

It is not certain whether the particles of ferric hydrous oxide of a character which retard deposition occur as an inorganic polymeric ion or as a colloidal particle. One critical parameter is believed to be the size of the particle in solution. The size of the particle in solution is related to the characteristic particle dimension $P_d$ of the particle which is found by filtering the feedwater. The dimension $P_d$ is expressed in units of length and is measured along a line extending between the two most widely separated points on the particle. Those ferric hydrous oxide compounds having a dimension $P_d$ at the time of measurement which is greater than one micron are not believed effective, while those having a dimension up to about one tenth of a micron are known to be effective. In particular, it is known that a particle dimension of up to 100 angstroms is the preferred characteristic particle dimension Pd.

These ferric hydrous oxide compounds may be made by any one of several processes. One way is to make the ferric hydrous oxide particles in suspension form in two steps. A concentrated solution of long shelf life (larger than one week) is made at room temperature by slowly hydrolyzing iron in a 0.1 to 0.6 molar solution having a pH of about 1 to 2 for periods up to 3 months. Prior to use, the concentrated solution is diluted with distilled water to the degree desired to form the actually used solution of higher pH. The effective life of the diluted solution is believed to be another critical parameter. The effective life is shorter than the shelf life of the concentrated solution and is believed to not exceed one week.

EXAMPLE

Ferric hydrous oxide particles of a character that retards deposition of iron based compounds in a conduit were prepared in two steps as follows:

1. 20.2 grams of ferric nitrate $Fe(NO_3)_3 \cdot 9H_2O$ were dissolved in a sufficient amount of distilled water at room temperature to produce a pH of approximately 1.5. The solution was kept at room temperature for ten days prior to use to form a slowly hydrolyzed ferric nitrate solution. It is believed this formed a suspension/solution of hydrous iron oxide FeOOH ($Fe_2O_3 H_2O$) particles. Transmission electron diffraction spectroscopy of the residue left after evaporation of the water from a sample showed alpha-FeOOH (goethite) compounds were present in the residue. The characteristic particle dimension Pd of these goethite compounds ranged from 50 to 100 angstroms. The goethite crystals may exist in the solution also or they may form only during evaporation of the water. It is believed that if refrigerated, this solution can be stored for a long period of time (at least two months).

2. The second step takes place prior to use. Prior to testing, the pH of the concentrated solution made by step 1 was raised to about 3.5 to 4.0 by diluting the concentrated solution with distilled water. It is believed that the diluted solution at this pH is slightly unstable and deteriorates after storage for five or six days. It is believed that the size of the FeOOH particles increases with time and that after five to six days the size of the particles has increased to a size which renders the particles ineffective for the purposes of this invention.

The dilute solution was tested in an apparatus as described above. The effectiveness of the fresh, dilute solution (less than one week old) was demonstrated by reversing in fifty hours at least one half the decrease in equivalent diameter of a fuel cell stack that occurred during one hundred fifty hours of operation. The equivalent diameter was then held constant for a further period of one hundred fifty hours. It is believed that this suspension/solution is effective for use in purified water as set forth above having a pH which is greater than 5.5. Water at a pH below 5.5 is not believed desirable for cooling systems for such powerplants because of the increase in corrosion of the powerplant and the possible effect that it has on the effectiveness of the ferric hydrous oxide.

Another method for preparing ferric hydrous oxide may be used in conjunction with the apparatus shown in FIG. 4 and FIG. 5. During operation of this embodiment, heat is transferred from the aqueous coolant in conduit 128 to purified water in the third chamber 138 to raise steam. The steam is flowed via conduit 144 to the spray nozzle 148. Purified water is flowed via conduit 96a" to the spray nozzle from the water treatment system. The purified water has a conductivity of less than one micromho or microsiemen per centimenter (and in the embodiment shown will likely be less than 0.5 micromhos or microsiemens per centimeter), has a pH that is nearly neutral (5.5-8), has some dissolved carbon dioxide and has an oxygen concentration of approximately 7 parts per million. In addition, the water contains iron based compounds typically in an amount of about 80-100 parts per billion.

Dissolved iron (predominantly $Fe^{++}$) is also present in the purified water supplied to the second chamber because of corrosion in the coolant recovery and supply system 18 and is present in the water contained in the bottom of the second chamber 136 because of corrosion of the iron rods 156 and the iron containing liner 158.

The steam and purified water are turbulently mixed as a result of passing through the spray nozzle 148 and are sprayed into the second chamber 136 toward the surface of the water. The second chamber is operated at atmospheric pressure and the water in the chamber is at a temperature which promotes the formation of type II ferric hydrous oxide. In the embodiment shown, the water is at a temperature of about 212° F. It is believed the temperature of the water should be in a range of about 180° F. to about 250° F.

As the mixture is sprayed into the second chamber, portions of dissolved oxygen and carbon dioxide are released above the steam-water interface 152. These gases are vented via vent 154. Because the second chamber is vented, the bottom of the tank has a low oxygen level and a pH that promotes the type of iron corrosion that forms ferrous ions. These ions are thought to migrate toward the steam-water interface.

Releasing portions of the dissolved carbon dioxide from the water sprayed into the second chamber and venting the carbon dioxide through vent 154 has a second, important benefit. Releasing the carbon dioxide causes the pH of the water in the spray and in the tank at the surface of the water to increase slightly. The increase in pH forces dissolved iron from the water entering with the spray and possibly forces dissolved iron from the water at the steam-water interface to precipitate in the form of type II ferric hydrous oxide. It is thought this action is promoted by agitation of the iron contained in the water through the turbulent injection of the steam and water spray. The oxygen content of the incoming water is also controlled by venting to avoid having too much oxygen present. If too much oxygen is present, the oxidation rate and subsequent precipitation is too rapid and has the undesirable result of forming $Fe_2O_3$ instead of forming type II ferric hydrous oxide which is a desirable result.

After forming the water containing the type II ferric hydrous oxide (FeOOH or $Fe_2O_3 H_2O$ of a character that retards deposition), the water is cooled to a temperature of about 140° F. in a low oxygen atmosphere (less than 60 parts per billion) and is then ready for use as feedwater in the powerplant.

Water containing type II ferric hydrous oxide which is not used during the lifetime of the prepared solution returns via a recirculation conduit 98 to the degasifier tank. The water is pumped through the water treatment system bed to remove aged and ineffective ferric hydrous oxide and other compounds from the water and to supply additional purified water to the apparatus shown in FIG. 5.

The ferric hydrous oxide additive is supplied to the coolant loop through the feedwater pump as needed to replace at least a portion of the water removed from the cooling system and water used to make steam for the fuel processor 44. Aqueous coolant removed via the blow down control is flowed to the ferric hydrous oxide generator for heat and thence to the condenser where the water is recovered and sent to the degasifier.

The method of determining the freshness and characteristic particle dimension associated with the retardation in deposition for any system includes the steps of:

1. Setting up an apparatus which accurately simulates the system which experiences the deposition of iron based compounds.
2. Filling the cooling system with purified water.
3. Establishing the initial equivalent diameter of the system.
4. Operating the cooling system: until a ten percent decrease in the effective diameter occurs; and, until the rate of decrease is established by measuring the decrease as a function of time.
5. Adding an amount of ferric hydrous oxide to the water flowed through the orifice, the residue of the ferric hydrous oxide having particles of a known characteristic particle dimension Pd.
6. Determining whether the deposition of iron based compounds has been blocked by monitoring the pressure drop and flow rate to determine whether the equivalent diameter decreases at the same rate (deposition not halted), decreases at a much reduced rate (blockage of deposition) stays the same (completely blocks deposition), or increases (reversal of the deposition process). The process is repeated with ferric hydrous oxide particles in varying amounts and varying freshness having a characteristic particle dimension which is smaller and smaller in size until finally the desired effect is observed.

Having established the effectiveness of the ferric hydrous oxide particles, the particles are added to the aqueous coolant, thus increasing the life of the cooling system and increasing the time between costly shutdowns and overhauls of the cooling systems.

Surprisingly, it was found that the use of type II ferric hydrous oxide has an additional benefit when used in boilers and particularly in the feedwater to such boilers such as the boiler shown in FIG. 7. This benefit appeared after years of operation in the form of a uniform dense protective wall layer of iron deposit (possibly maghemite, gamma $Fe_2O_3$) without evidence of excessive corrosion or excessive suspended corrosion products. Periodic cleaning of the boiler was unnecessary over a period of several years and there is no indication of a near future need to perform such cleaning.

In fact, one boiler when replaced by an uprated unit, was resold at a premium price because of its like new condition.

It was determined that type II ferric hydrous oxide when present in feedwater, as set forth above for the feedwater to the cooling system of the fuel cell power plant via conduit 22 or 100, to a boiler prevents significant corrosion or deposition from occurring over years of operation; dissolved oxygen levels in the 60 to 200 ppb range were also present in the feedwater and are believed to be involved in a manner (not yet cnfirmed) which prolongs the life of the ferric hydrous oxide at the elevated temperature of the water. It is thought that a range of 20–400 ppb would be acceptable.

Although the invention has been shown and described with respect to detailed embodiments thereof, it should be understood by those skilled in the art that various changes in form and detail thereof may be made without departing from the spirit and the scope of the claimed invention.

We claim:

1. An apparatus having a flow path for an aqueous solution, the aqueous solution including water and iron based compounds which deposit on the interior of the apparatus, the water being capable of reacting with its environment to form iron based compounds, wherein the improvement comprises an apparatus which has an aqueous solution consisting essentially of:

water having a pH which is at least 5.5, having an electrical conductivity which is less than or equal to one micromho per centimeter, having a solids content which is less than one part per million (1 ppm), the solids content including an amount of iron based compounds other than ferric hydrous oxide, and the water further containing ferric hydrous oxide of a character and of an amount that retards the deposition of said iron based compounds on the interior of the apparatus.

2. The apparatus of claim 1 wherein said ferric hydrous oxide has a characteristic particle dimension that promotes said retardation of deposition on the interior of the apparatus.

3. The apparatus as claimed in claim 1 wherein said ferric hydrous oxide has a characteristic particle dimension Pd which is less than or equal to one-tenth of a micron ($Pd \leq 0.1$ micron) after filtration of the water from the aqueous solution.

4. The apparatus as claimed in claim 3 wherein the characteristic particle dimension Pd of the ferric hydrous oxide is about forty to one-hundred angstroms ($Pd = 40-100\text{Å}$) after filtration of the water from the aqueous solution.

5. The apparatus as claimed in claim 3 wherein the water is nearly neutral and wherein the ferric hydrous oxide leaves a yellow stain on forty-five hundredths of a micron (0.45 microns) filter paper after passing one liter of the aqueous solution through the filter paper.

6. The apparatus as claimed in claim 5 wherein the apparatus includes a boiler and a feedwater conduit for said boiler, the feedwater conduit bounding said flow path for the aqueous solution.

7. The apparatus as claimed in claims 1, 2, 3, 4, 5, or 6 wherein oxygen is dissolved in the water.

8. The apparatus as claimed in claim 7 wherein the water contains dissolved oxygen at levels which range from 20 to 400 ppb, and wherein the water reaches a temperature which is approximately equal to or above 100° C. under operative conditions of the apparatus.

9. The apparatus as claimed in claim 7 wherein the water contains dissolved oxygen at levels which range from 40 to 80 ppb, and wherein the water reaches a temperature which is approximately equal to or above 100° C. under operative conditions of the apparatus.

10. The apparatus as claimed in claim 8 wherein at least a portion of said ferric hydrous oxide is goethite after filtration of the water from the aqueous solution.

11. An apparatus having a flow path for an aqueous solution, the aqueous solution including water and iron based compounds which deposit on the interior of the apparatus, the water being capable of reacting with its environment to form iron based compounds, wherein the improvement comprises:

water having a pH which is at least 5.5, having an electrical conductivity which is less than or equal to five-tenths of a micromho per centimeter, having a solids content which is less than one part per million (1 ppm), the solids content including an amount of iron based compounds other than ferric hydrous oxide; and, means for disposing ferric hydrous oxide in the water wherein said ferric hydrous oxide is of a character that retards the deposition of said iron based compounds on the interior of the apparatus.

12. The apparatus of claim 11 wherein the apparatus includes a boiler for raising steam and a conduit for flowing said water having a pH of at least 5.5 to the boiler as feedwater for said boiler and wherein said means for disposing ferric hydrous oxide in said water is in flow communication with said conduit.

13. The apparatus of claim 12 wherein the boiler has process water having an electrical conductivity of less than ten micromhos per centimeter.

14. The apparatus as claimed in claim 11 wherein at least a portion of said ferric hydrous oxide after filtration of the water from the aqueous solution is goethite and has a characteristic particle dimension Pd which is less than or equal to one-tenth of a micron.

15. The apparatus as claimed in claim 14 wherein the means for disposing ferric hydrous oxide in the aqueous solution includes a means for injecting a quantity of water containing ferric hydrous oxide into the aqueous solution.

16. A method of operating a boiler which uses feedwater to form an aqueous solution, the boiler having at least one flow path for the aqueous solution which extends through the boiler and at least one conduit for the aqueous solution through which the flow path extends, the aqueous solution including water and iron based compounds which deposit on the interior of the conduit, the water being capable of reacting with its environment to form iron based compounds, the improvement which comprises:

providing the boiler with feedwater having a pH which is at least 5.5, an electrical conductivity which is less than or equal to one micromho per centimeter, a solids content which is less than one part per million (ppm), disposing in the feedwater ferric hydrous oxide of a character and of an amount which blocks the deposition of iron based compounds from said aqueous solution in said conduit of the boiler and which promotes the formation of a protective wall layer of iron deposit without evidence of corrosion greater than equivalent systems which do not have said ferric hydrous oxide.

* * * * *

UNITED STATES PATENT AND TRADEMARK OFFICE
CERTIFICATE OF CORRECTION

PATENT NO. : 4,835,072

DATED : May 30, 1989

INVENTOR(S) : Albert P. Grasso et. al.

It is certified that error appears in the above-identified patent and that said Letters Patent is hereby corrected as shown below:

Col. 2, line 24, "cubic foot" should read --hour--

Signed and Sealed this

Twenty-fourth Day of April, 1990

*Attest:*

HARRY F. MANBECK, JR.

*Attesting Officer*  *Commissioner of Patents and Trademarks*